United States Patent
Michl et al.

(10) Patent No.: US 7,587,519 B2
(45) Date of Patent: Sep. 8, 2009

(54) METHOD AND DEVICE FOR MODIFYING MODULAR MESSAGES

(75) Inventors: Andreas Michl, Munich (DE); Michael Roth, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 335 days.

(21) Appl. No.: 10/545,405

(22) PCT Filed: Feb. 2, 2004

(86) PCT No.: PCT/EP2004/000928

§ 371 (c)(1),
(2), (4) Date: Aug. 10, 2005

(87) PCT Pub. No.: WO2004/072850

PCT Pub. Date: Aug. 26, 2004

(65) Prior Publication Data

US 2006/0161684 A1 Jul. 20, 2006

(30) Foreign Application Priority Data

Feb. 14, 2003 (DE) ............... 103 06 326
Mar. 26, 2003 (DE) ............... 103 13 589

(51) Int. Cl.
*G06F 15/16* (2006.01)
(52) U.S. Cl. .................. 709/246; 709/206; 719/313
(58) Field of Classification Search .......... 709/206, 709/246; 719/313
See application file for complete search history.

(56) References Cited

U.S. PATENT DOCUMENTS

| 5,812,145 A | 9/1998 | Holzmann et al. |
| 6,502,112 B1 | 12/2002 | Baisley |
| 6,668,284 B1 * | 12/2003 | Parkhurst .................... 719/313 |
| 7,200,635 B2 * | 4/2007 | Yashchin et al. ............ 709/206 |
| 2002/0085032 A1 | 7/2002 | Fong et al. |
| 2002/0156896 A1 | 10/2002 | Lin et al. |
| 2003/0005082 A1 | 1/2003 | Shah et al. |

FOREIGN PATENT DOCUMENTS

| CA | 2255047 | 5/2000 |
| DE | 101 39 068 A1 | 2/2003 |
| EP | 0 525 712 A2 | 2/1993 |
| JP | 04299757 A | 10/1992 |

OTHER PUBLICATIONS

International Preliminary Report on Patentability.
International Search Report.
Kuschke Wölfel, Web Service Kompakt, Spektrum Akademischer Verlag GMBH, Berlin, 2002, pp. 15-34, XP-002285014.

* cited by examiner

*Primary Examiner*—Salad Abdullahi
*Assistant Examiner*—El Hadji M Sall
(74) *Attorney, Agent, or Firm*—Ditthavong Mori & Steiner, P.C.

(57) ABSTRACT

A method and device for modifying modular messages transmittable via an electronic transmission system is described in which a message is read using a read devie and the structure of the message is determined. An individual structural unit of the message can be selected, in which the possible modifications and/or functions can be determined, displayed, and selected. The selected modification is verified for validity with regard to the structure of the message, and, if the modification is valid, execution, whereupon a modified, new message is issued.

17 Claims, 12 Drawing Sheets

METHOD AND DEVICE FOR MODIFYING MODULAR MESSAGES

FIELD OF THE INVENTION

The invention relates to a method and a device for modifying messages of modular structure, which can be transmitted via an electronic message transmission system.

BACKGROUND OF THE INVENTION

Published German patent application no. DE 101 39 068 A1 discloses that a sequence of commands can be generated automatically for a hierarchically-constructed command structure. For this purpose, a complete set of possible commands is initially generated by storing all possible branches through the individual levels of the hierarchy as individual commands. Each command corresponds to a path from the highest to the lowest level of the hierarchy. The individual commands generated in this manner are then arranged in a random sequence, wherein repetitions of an individual command are permitted This sequence of individual commands is then supplied, for example, to a measuring device, which works through the commands successively. If a system error occurs during the implementation of a processing run of this kind, the entire sequence of individual commands is systematically shortened, in order to determine the chain of individual commands, which caused the system error. The individual commands are not modified in themselves during this process.

The procedure described is only suitable for systems, which process individual commands. It allows a limitation to a smaller number of individual commands, which are, however, already present a priori in the original command chain. It is not possible to generate an individual command and/or an individual message with the system proposed. However, the development of end systems, which operate according to the OSI reference model, requires either a modification of this kind or a generation of new, individual commands.

SUMMARY OF THE INVENTION

There exists a need to provide a method and a device for modifying messages of modular structure capable of transmission via an electronic message transmission system, which allows a convenient generation and modification of messages within a structure specified for the message.

In accordance with one aspect of the present invention, a message, for example, as transmitted between two layers of an OSI reference model, is first read in. The structure underlying this message is determined from the read-in message. By determining the structure underlying the message, it is possible to determine which modifications are feasible in absolute terms for the respective structural unit for every structural unit, from which the complete message is built up. A single structural unit is then selected from the read-in message and the modifications feasible for this selected structural unit are determined and displayed on a display device.

An intentional modification to the selected structural unit is then read in and its validity with respect to the structure of the message as a whole is checked. Modifications, which are, in principle, valid for an individual structural unit, but which, in the context of a message, would lead to an irregular message, can be prevented in this manner, because only such modifications to a structural unit, which are recognised in the check as valid for the structure of the message, are implemented. The complete message modified in this manner is then issued as a new message.

It is particularly advantageous in one embodiment, if a real message is read in as the basis for generating a new message by modification. In this context, a real message is understood to mean a message, which, in a preceding test of the end system represented by the OSI model, was actually generated and stored in its so-called "log file". If this message is recognised by a developer as causative for an occurring error, then the developer can carry out modifications to the message, without having to re-structure the entire message with all its hierarchically-constructed structural units, and use the new message generated in this manner for a further test run. This procedure is particularly suitable for implementing relatively small modifications during the development of an end system operated according to the OSI reference model.

At the start of a development, however, no real messages, which are transmitted within the system between the individual layers of the OSI reference model, are available yet. At this stage, it is therefore necessary to generate complete, new messages. For this purpose, according to a further advantageous development, it is possible to read in a basic message from a databank, so that the ultimately-required message can be generated by modifications to the structural units of the basic messages. The structure of the message, within which the modifications can be implemented, is therefore determined by drawing on a basic message, which is read in from a given data bank corresponding to the protocol used. Different databanks can be provided for different protocols.

Moreover in an embodiment, it is advantageous to display the structure of the read-in message graphically, so that it is immediately evident to the developer, which structural unit of the message is currently being modified. The message and its structure are displayed in a similar manner to the presentation of a file tree, so that the individual hierarchical levels of the message can be distinguished from one another by appropriate indentation. In this context, the structure is advantageously presented in a first window of a display device, so that a structural unit displayed in the first window can be marked using an appropriate selection means, such as a computer mouse.

The structural unit marked in the first window allows various modifications or functions, which are dependent upon each marked structural unit. For example, there may be elements of the message, for which a parameter modification can be implemented, for which purpose, the developer must enter a corresponding alphanumeric value. Other elements allow the adoption of one or more structural units, which are subordinate in the hierarchy. The options resulting for a structural unit selected on the basis of a marking in the first window are displayed in a second window. The developer can then implement the selection of predetermined modifications and/or the entry of values in the second window.

After implementation of the entry and/or the selection in the second window, the modification, which is then to be implemented, is checked with regard to its validity within the structure of the message as a whole. Since a structural unit of a given type can stand with other, superordinate structural units in different hierarchical levels and/or different contexts, a modification feasible in principle for a structural unit of a given type is not necessarily also valid for the selected structural unit. For example, it may be that given modifications are indeed possible, in principle, for a selected structural unit, but not valid for the particular structure of the complete message, from which the structural unit to be modified, is selected. If a case of this kind occurs, the developer is notified by means of a corresponding dialog box, in which a possible or anticipated modification can be explicitly listed.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

A preferred exemplary embodiment of the method according to the invention is explained in greater detail below on the basis of the drawings. The drawings are as follows.

DETAILED DESCRIPTION OF THE PREFERRED EMBODIMENT

Before describing in greater detail the method according to the invention for generating messages of modular structure, the structure of a message of modular structure will first be explained by way of example with reference to FIGS. 1 and 2.

Figure 1:
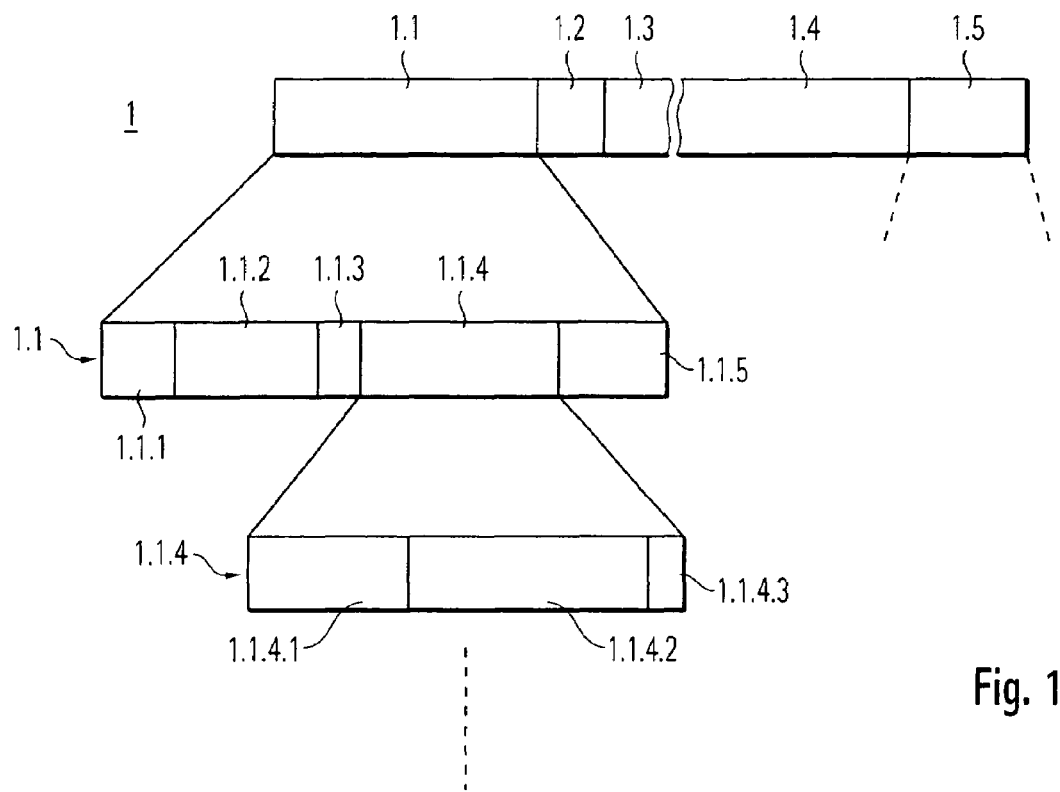
FIG. 1 shows a schematic presentation for a structure of a message of modular structure.

FIG. 1 shows a message 1, as used, for example, for service provision through one of the layers according to the OSI reference model. The message 1 consists of several segments, which are indicated in FIG. 1 with the reference numbers 1.1, 1.2, 1.3, 1.4 and 1.5. The first segment 1.1, is further subdivided into blocks 1.1.1, 1.1.2, 1.1.3, 1.1.4 and 1.1.5. The other segments of the complete message 1 can also be broken down into blocks of this kind. The individual blocks of the segment 1.1 can also be broken down into smaller units 1.1.4.1, 1.1.4.2 and 1.1.4.3. Subdivision into smaller and smaller structural units as presented leads to a hierarchical system for the message 1, which reflects its modular construction or structure. The messages 1, which are to be generated using the present invention, provide a modular structure of this kind, wherein the individual structural units are combined to form superordinate structures based upon a logical association of structural units. The messages 1 represent, for example, elements of a data stream, which is exchanged between the different layers according to the OSI reference model of a base station or a mobile telephone station in a cellular mobile telephone network.

Figure 2:
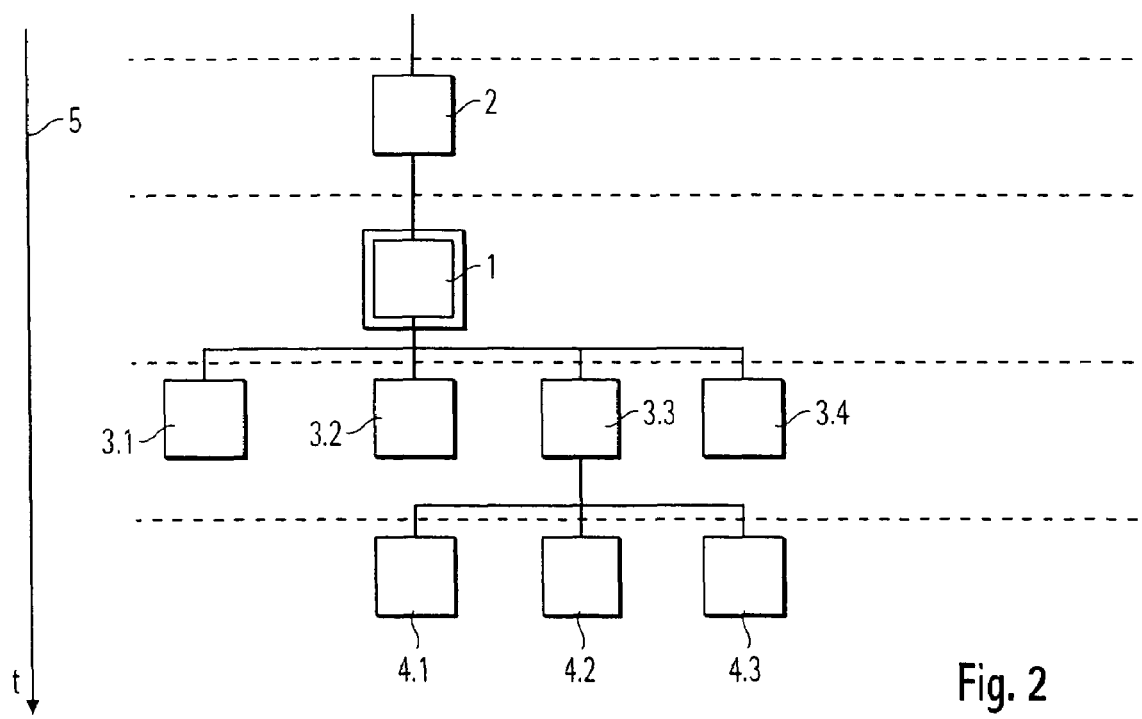
FIG. 2 shows a time sequence for several generations of messages.

Starting from a given message 1, FIG. 2 shows a message flow through several generations. The message 1 is preceded by a message 2 of a parent generation. The message 1 has itself been triggered by the content of the message 2 of the parent generation. As illustrated by the connecting lines, the message 1 is, in turn, the cause for a triggering of further messages 3.1, 3.2, 3.3 and 3.4, which belong to a child generation. The messages 3.1 to 3.4 of the child generation can, once again, be responsible in a causative manner for triggering further messages 4.1, 4.2 and 4.3, as illustrated by way of example for the message 3.3 of the child generation. The individual messages presented in FIG. 2 are built up according to a modular structure in each case on the basis of the scheme presented in FIG. 1. In this context, a single structural unit of a given type can, under some circumstances, be used at different levels of the hierarchy, that is to say, both in segments 1.1 to 1.5 and also, for example, in blocks 1.1.1 to 1.1.5.

FIG. 2 illustrates the causal connection between several messages along a time axis 5. These messages can be recorded using a message-analysis device for analysing, for example, a mobile telephone system. If this listing, which is stored in a so-called "log file", can be used to identify that a given message leads to errors, then the relevant message must be replaced by an appropriately modified message. In this context, the modified, new message, can, in principle, be generated in two different ways. On one hand, the existing error-triggering message can be used to generate a new message, which has the same structure, as the original message, by modifying the content of one or more structural units, that is to say, by modifying the segments, blocks or smaller units. Against this background, the original message taken from the "log file" is referred to below as a real message. This also applies vice versa from the bottom to the top of the hierarchy.

A second possibility for generating a message is to read in a basic message from a data bank. As will be explained in greater detail below, a number of basic messages are stored in the respective data banks for a given protocol, wherein each of the individual basic messages is representative of a valid structure with respect to the given protocol. The basic message therefore corresponds to a ready-made structure, from which the actually required complete message can be generated by modifying individual structural units.

Figure 3:
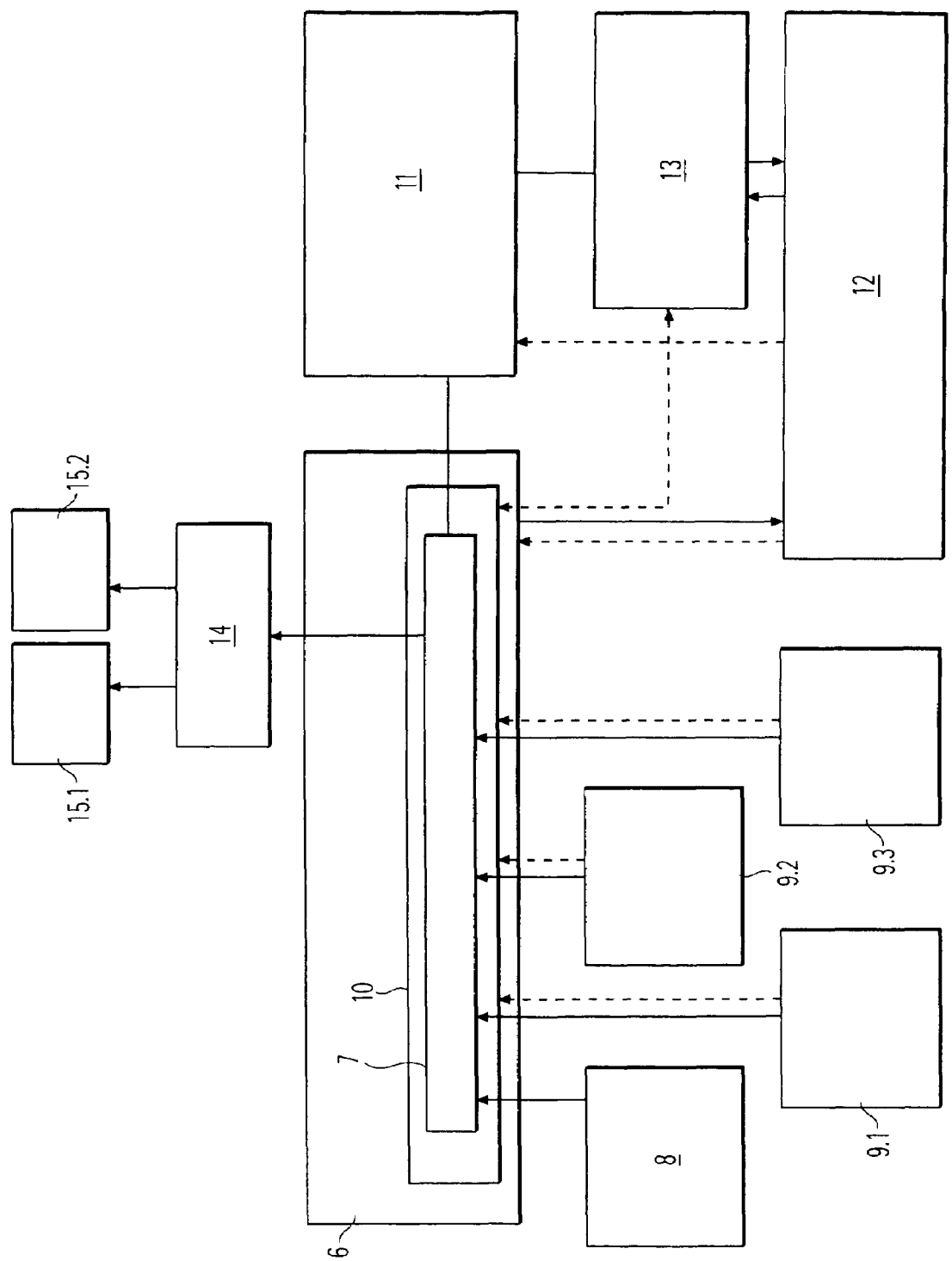
FIG. 3 shows a block circuit diagram of the method according to the invention.

The method according to the invention will now be explained in greater detail with reference to the block circuit diagram shown in FIG. 3. A message 7 is read in by means of a read-in device 6. The message 7 read in at this stage can be a real message, which is stored in a file 8. Each message 7 has a given structure, so that the messages can be type coded. A structure 10, upon which a real message is based, is also read in by the read-in device 6.

A structural unit from the message 7 is selected by a selection device 11. For this purpose, the read-in device 6 is connected to an input/output device 12, wherein the input/output device 12 comprises a display device, on which the message 7 read in can be displayed in a first window. The read-in message 7 is displayed in the first window of the display device in such a manner that all of the structural units of each level of the hierarchy including all subordinate structural units are presented. As in the presentation of a file tree, subordinate structural units can be masked if required. The developer can mark one of the structural units presented in any required level of the hierarchy using a suitable selection means. This may, for example, be a computer mouse. The structural unit marked by the developer is selected by the selection device 11.

For further processing, the selected structural unit is transferred to a modification device 13, which initially determines the modifications feasible in principle for the type of structural unit selected. The modification device 13 also communicates these feasible modifications to the input/output device 12, and the possible modifications are presented by the display device in a second window. The developer now makes another entry in this second window, which is communicated back to the modification device 13. As will be explained with reference to the other drawings below, an entry of this kind can either be a selection from a number of suggested elements or an alphanumerical entry.

The entry, by means of which the developer determines an intended modification to the content of the selected structural unit, is checked by the modification device 13 with regard to its validity. The validity of the message type may be restricted, for example, if an insertion of the modification of the selected structural unit into the message 7 leads to a new message instead of the corresponding, originally read-in structural unit, which therefore no longer corresponds to the structure 10 of the originally read-in message 7. Modifying the content of the selected structural unit would then lead to a modification of the structure of the message, which no longer corresponds to the structure of the message required by the underlying standard at this position in the OSI reference model. An invalid modification of this type is not implemented and the developer's attention is drawn to the intended invalid modification by a warning message.

If the modification of the selected structural unit is valid, a message with modified content is generated as a new message 7', and this new message 7' is issued via an output device 14. Various output formats are available for the output of the new message 7' in this context. For example, the new message 7' can be stored in a first output file 15.1 in form of XML code. The insertion of the message 7' generated in this manner into the original data stream then takes place at the operating time, during a new test run of the end system, on which the OSI reference model referred to above is based.

As an alternative selection, the output device 14 can write the new message 7' directly into a second output file 15.2 in the form of a hexadecimal string (hexadecimal bit sequence).

As explained above, instead of reading in a real message, a basic message can also be read in as the message 7. For this purpose, the developer can, once again, make an entry via the input/output device 12. In response to this entry, a basic message is read in by the read-in device 6 from one of several possible data banks 9.1, 9.2 or 9.3. The data banks are modular in structure and vary with regard to their underlying description language, for example, ASN1, or the protocol to be copied. Various message structures are possible dependent upon the protocols. The respective structure allocated to a basic message is also read in by the read-in device 6. The information about the structure 10 is necessary, so that the modification device can subsequently check the validity of the modification of the message 7 within the structure 10. When using a real message, information relating to the structure is also read in from one of the data banks. A corresponding data bank can then be automatically selected on the basis of the real message.

The individual stages of the method for generating new messages 7' are explained below with reference to various screen shots.

Figure 4:
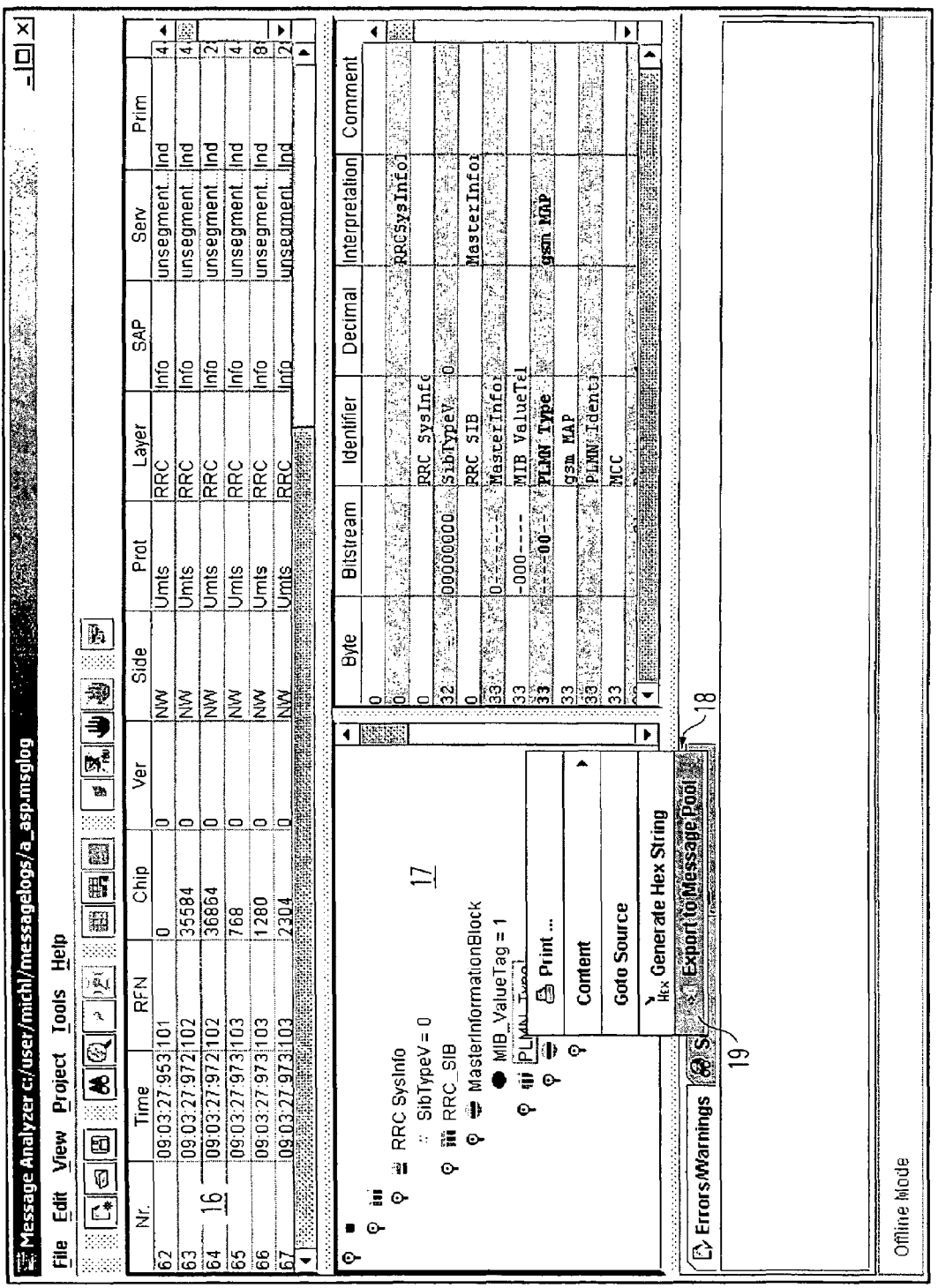
FIG. 4 shows a screen shot for selecting a real message using a message-analysis device.

Initially, FIG. 4 shows a message-analysis device. In a first region 16, all of the messages transmitted in an end system via the various layers of the OSI reference model are presented in chronological order. A second region 17 shows the hierarchical structure of a message, which can be selected in the first region 16. In this context, each subordinate level of the hierarchy is shown indented to the right relative to its superordinate hierarchical level. Each line of the presentation corresponds to one structural unit, wherein each structural unit can be subdivided into further hierarchically subordinate structural units, as described above with reference to FIG. 1. One of the structural units can be marked in the second region 17 and can then be stored in a file using a pull-down menu. In the exemplary embodiment shown, the relevant command 19 is "Export to Message Pool", wherein the "Message Pool" corresponds to the file 8 already familiar from the block circuit diagram of FIG. 3.

Figure 5:
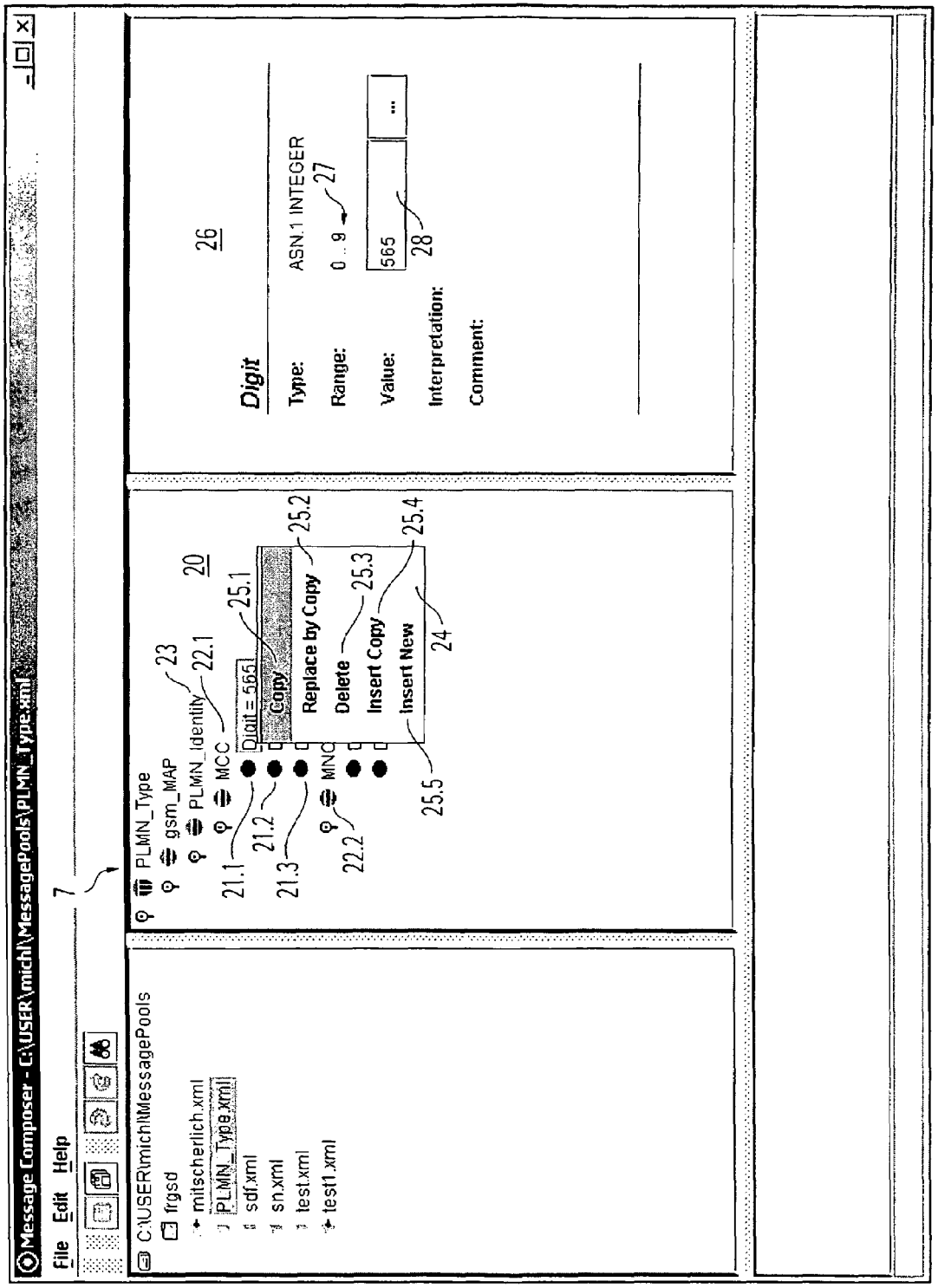
FIG. 5 shows a screen shot with functions dependent upon a structural unit.

Opening and reading in the message from the file 8 corresponds to the procedure for other conventional programs; a separate description is therefore not required. FIG. 5 shows a screen shot, which occurs after a message 7 has been read in from the file 8. The structure of the read-in message 7 is presented in a first window 20. The presentation corresponds to that of the second region 17 of the message-analysis device shown in FIG. 4. In the lowest hierarchical level of message 7, for example, three structural units 21.1 to 21.3 are presented, which form the superordinate structural unit 22.1 when combined. On the same hierarchical level as the structural unit 22.1, another structural unit 22.2 is shown. The two structural units 22.1 and 22.2 together form the structural unit 23, which is again formed one hierarchical level higher.

In the first window 20, the structural unit 21.1 has been marked using the selection means, and the pull-down menu has been opened. The pull-down menu is presented in a pull-down-menu window 24 and contains various functions 25.1 to 25.5, such as copy and insert functions, by means of which a new message can also be generated. For this purpose, for example, an already-existing structural unit can be copied and additionally inserted at another position in the message. The validity of the operation is then checked as in the case of a modification of the content of a selected structural unit. The presented functions 25.1 to 25.5 can vary in this context, depending on the structural unit, for which the pull-down menu 24 is opened. In the example presented in FIG. 5, the function "Copy", with which the marked structural unit 21.1 is to be copied, is selected. However, if the insertion of the structural unit copied in this manner into another structural unit, for example, the structural unit 23, is not possible, then a pull-down the menu opened with regard to the structural unit 23 would not provide a corresponding insert option.

Alongside the modification of the message 7 by the functions of the pull-down menu 24, such as copy, insert, replace and so on, it is also possible to modify the content of a structural unit already present in the message.

Each structural unit corresponds to a different type. The type of the structural unit 21.1 in the exemplary embodiment, for example, has the name "Digit". Certain modification options are always available for a structural unit of this type. These modification options are presented in a second window 26 for each structural unit marked and selected in the first window 20. On the basis of the marking, which the developer provides in the first window 20, the structural unit highlighted by the marking is selected by the selection device 13. For the selected structural unit, the type of the structural unit can then be determined, and the resulting modification options are then presented in the second window 26. Further information, which relates to the selected structural unit, is additionally displayed in the second window 26.

In the exemplary embodiment presented, a possible value range ("Range") 27, which a structural unit of this type can accept, is also indicated alongside the naming of the type ("Type") of the structural unit. The developer can determine a value for the structural unit 21.1 by entering a value in an entry field 28, for example, by means of a keyboard. The value written into the entry field 28 is read in by the modification device 13. Before the structural unit 21.1 is modified to the value entered, the validity of the modification is checked by the modification device 13. If a modification of this kind is not valid, a warning message described below is issued and the modification is not implemented.

However, if the modification is valid, a modified structural unit 21.1' is formed from the selected structural unit 21.1, and together with this, a new message 7' is formed from the originally read-in message 7.

Figure 6:
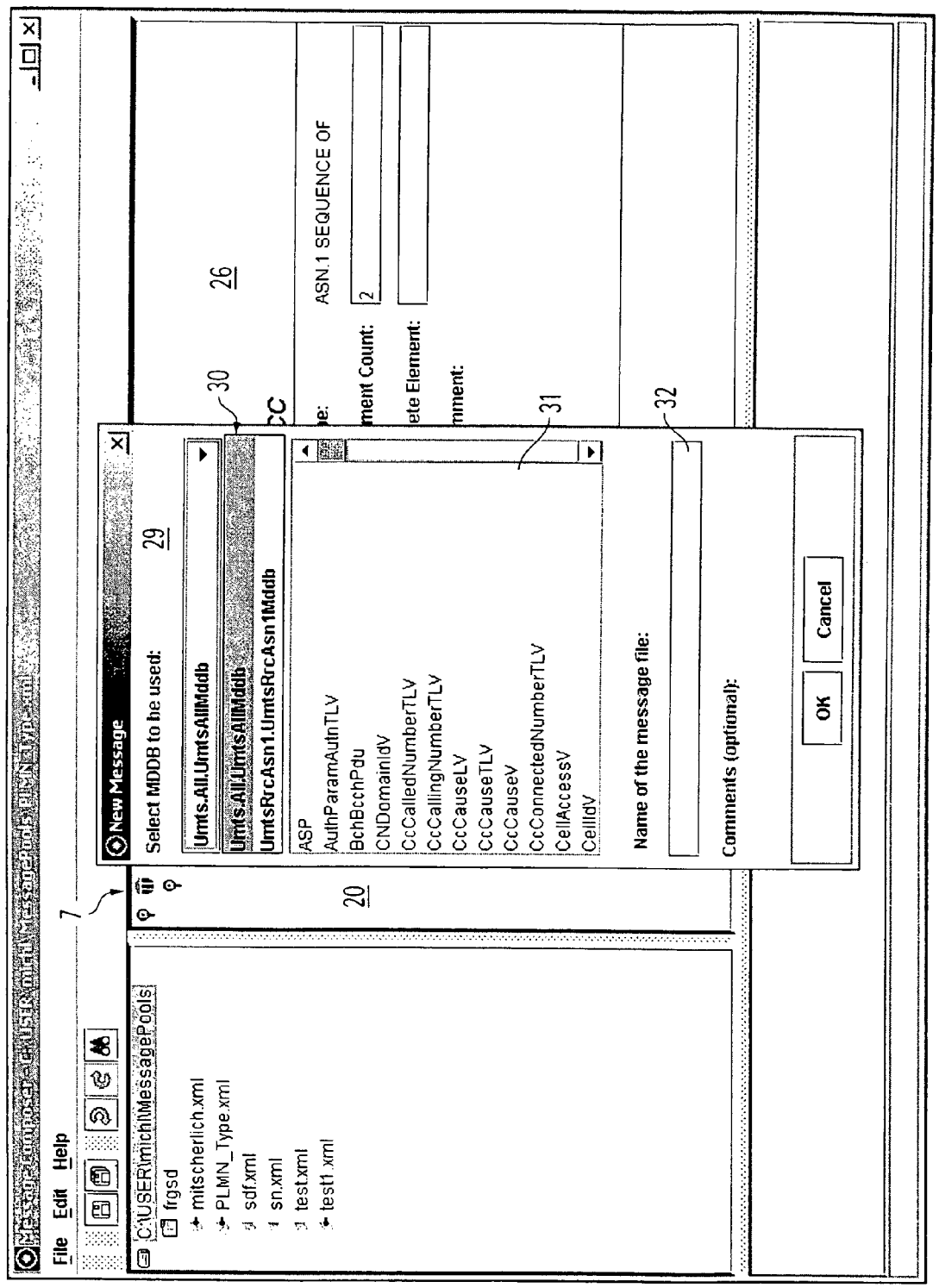
FIG. 6 shows a screen shot for selecting a data bank for a new message.

In order to generate a new message, a dialog window 29 is initially opened, as illustrated in FIG. 6. In the dialog window 29, a list 30 of available data banks is shown, wherein the read-in device 6 is connected to the selected data bank 9.1, a 9.2 or 9.3 by marking a data bank from the list 30, so that access to the structures and basic messages stored in the respective data bank 9.1 to 9.3 is gained by means of the read-in device 6.

After the selection of a data bank via the list 30, the entries present in the corresponding data bank are listed in a window section 31. Each entry in the window section 31 corresponds to a basic message and therefore to a structure of a message underlying this basic message.

Once again, a basic message is selected from the list by marking in the window section 31; this basic message is then stored under a name to be entered in a file name entry field 32.

Figure 7:
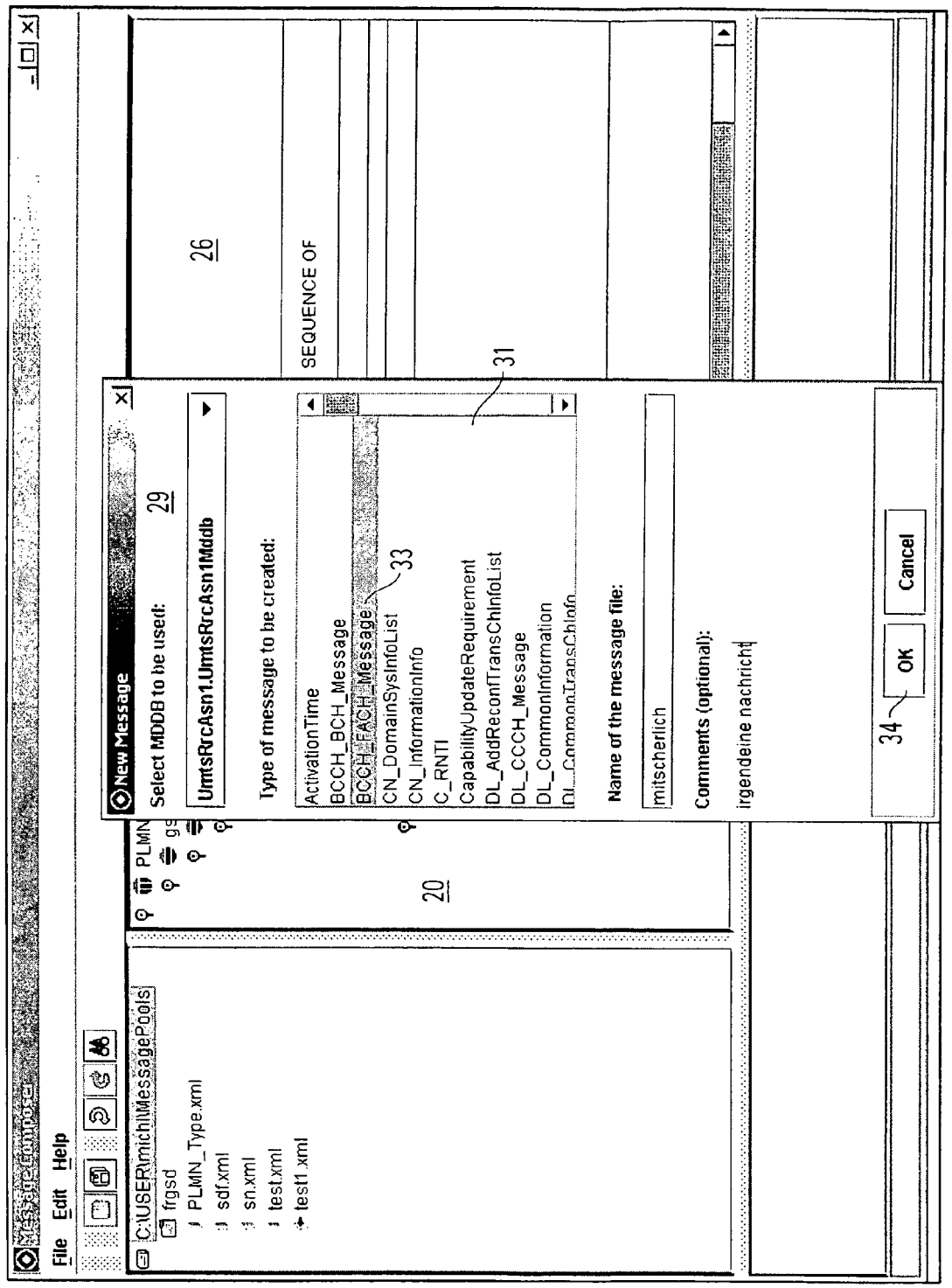
FIG. 7 shows a screen shot for selecting a basic message from a data bank.
Figure 8:
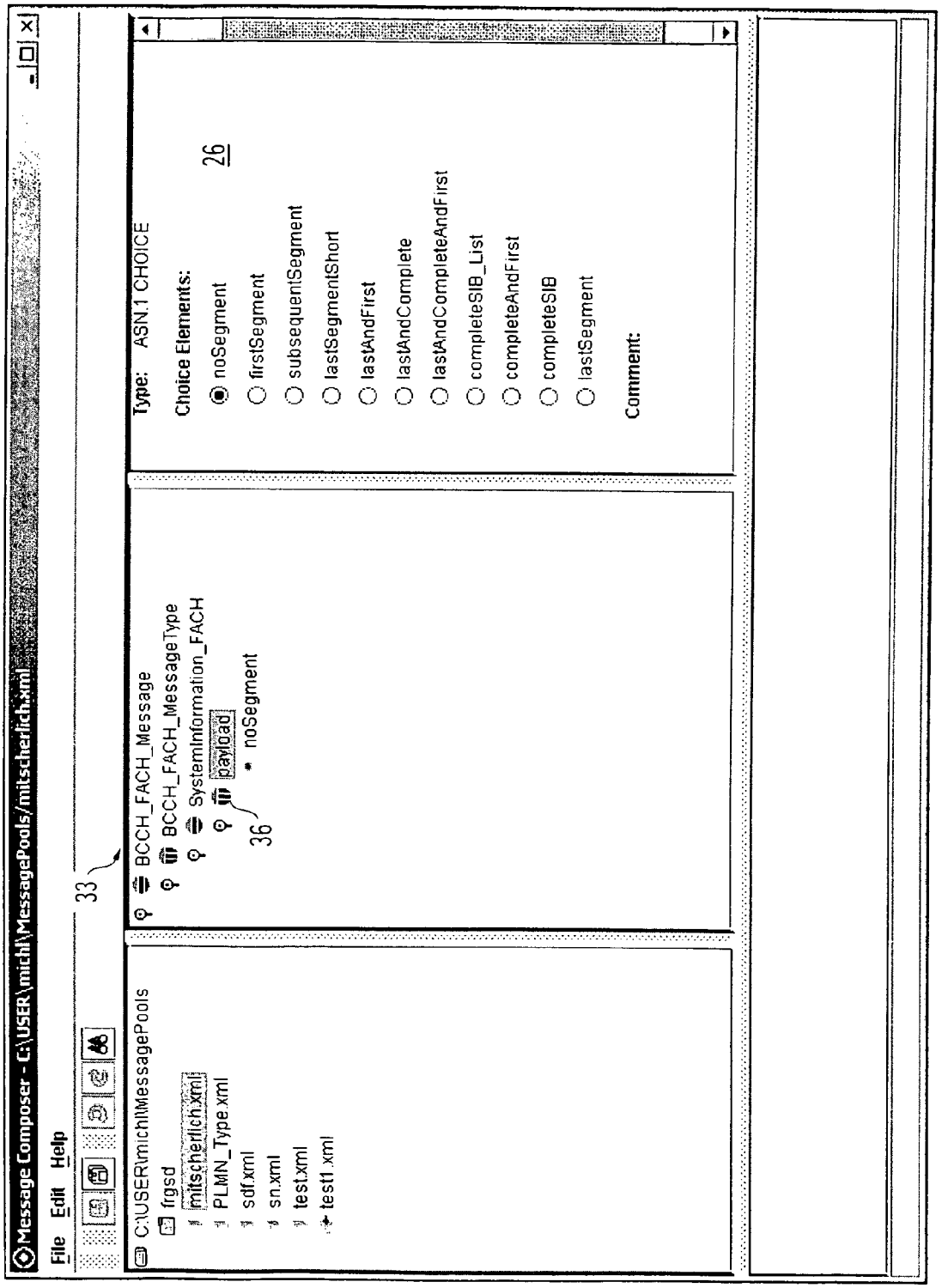
FIG. 8 shows a screen shot with a selection list for modifications of a selected structural unit.

In the presentation of the screen shot in FIG. 7, a different data bank has been selected, so that the basic messages shown in the window portion 31 differ from those of FIG. 6. In the exemplary embodiment illustrated, a given basic message 33 has already been marked in the window section 31. If the entry in the dialog window 29 is terminated by activating a functional field 34 with the transfer of the data entered in the dialog window 29, the structure of the given, modified basic message 33 is presented directly in the first window 20, as shown in FIG. 8.

Figure 9:
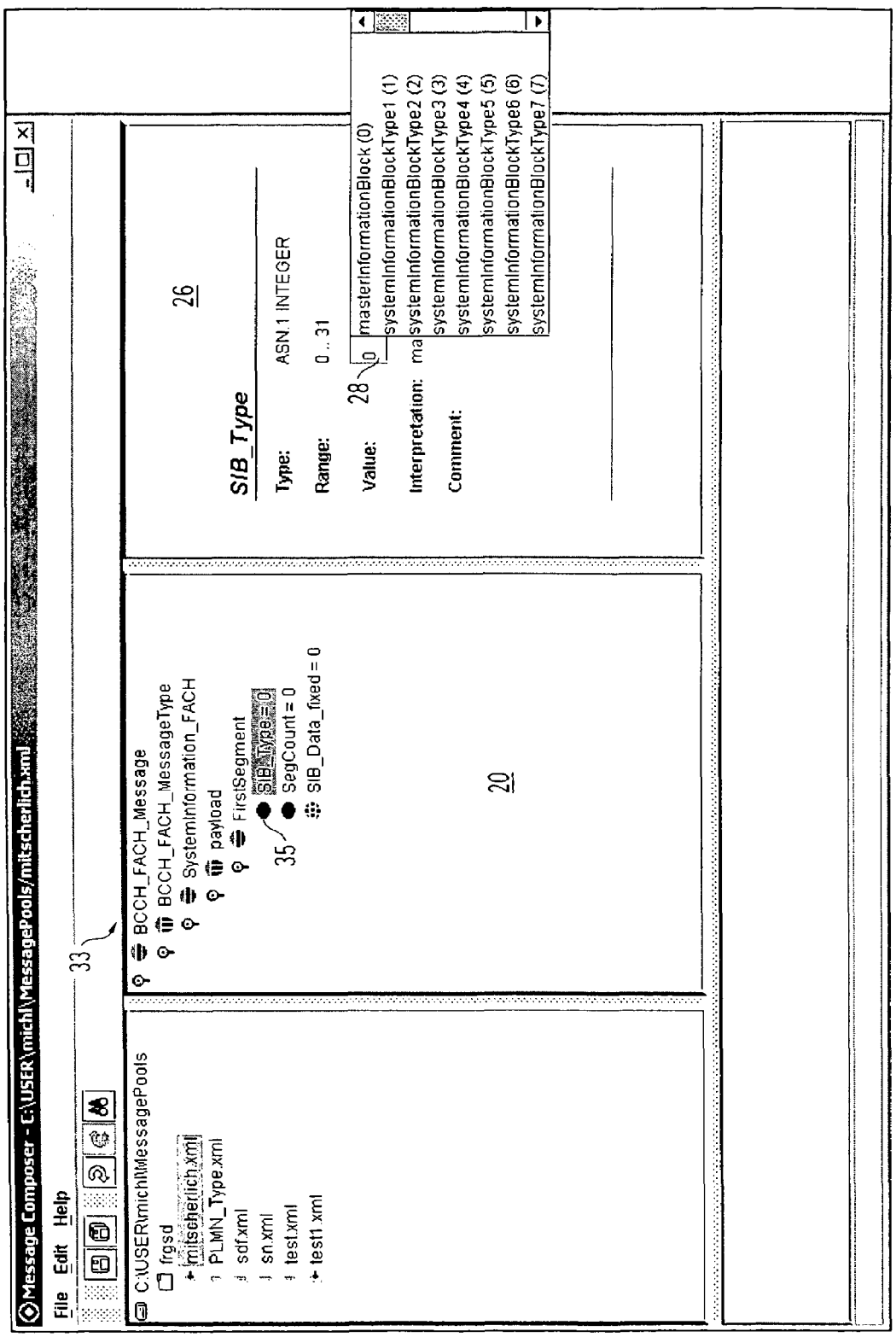
FIG. 9 shows a screen shot with a further selection list for modifications of a selected structural unit.

Amongst other components, the basic message 33 comprises, the structural unit 36, for which a list of subordinate structural units is indicated in the second window 26. The preliminary setting for reading in the basic message in the exemplary embodiment presented is "no segment". If the subordinate structural unit "first segment" is selected instead in the list, then the modification of the content of the structural unit 36 recognised as valid is implemented and the up-dated presentation of the modified basic message 33' is displayed in the first window 20, as shown in FIG. 9.

After the newly inserted structural unit 35 has been selected, the second window 26 once again displays the potential modifications to the structural unit 35, which are feasible. Instead of entering an alphanumerical value in the entry field 28, several possible entries in a selection menu are presented. If a value shown in the selection menu is entered by marking, the value marked in this way will be read in by the modification device 13, and after the validity has been checked, the content of the selected structural unit will be modified accordingly.

As a result of the modifications, the basic message 33 originally read-in has now become a complete message 33", which is present in the main memory of an arithmetic unit as XML code. The processing of the messages 7, that is to say, of the basic message 33 or of a real message, takes place in XML code. The new, complete message 33" can be stored in this XML code via the output device.

Figure 10:
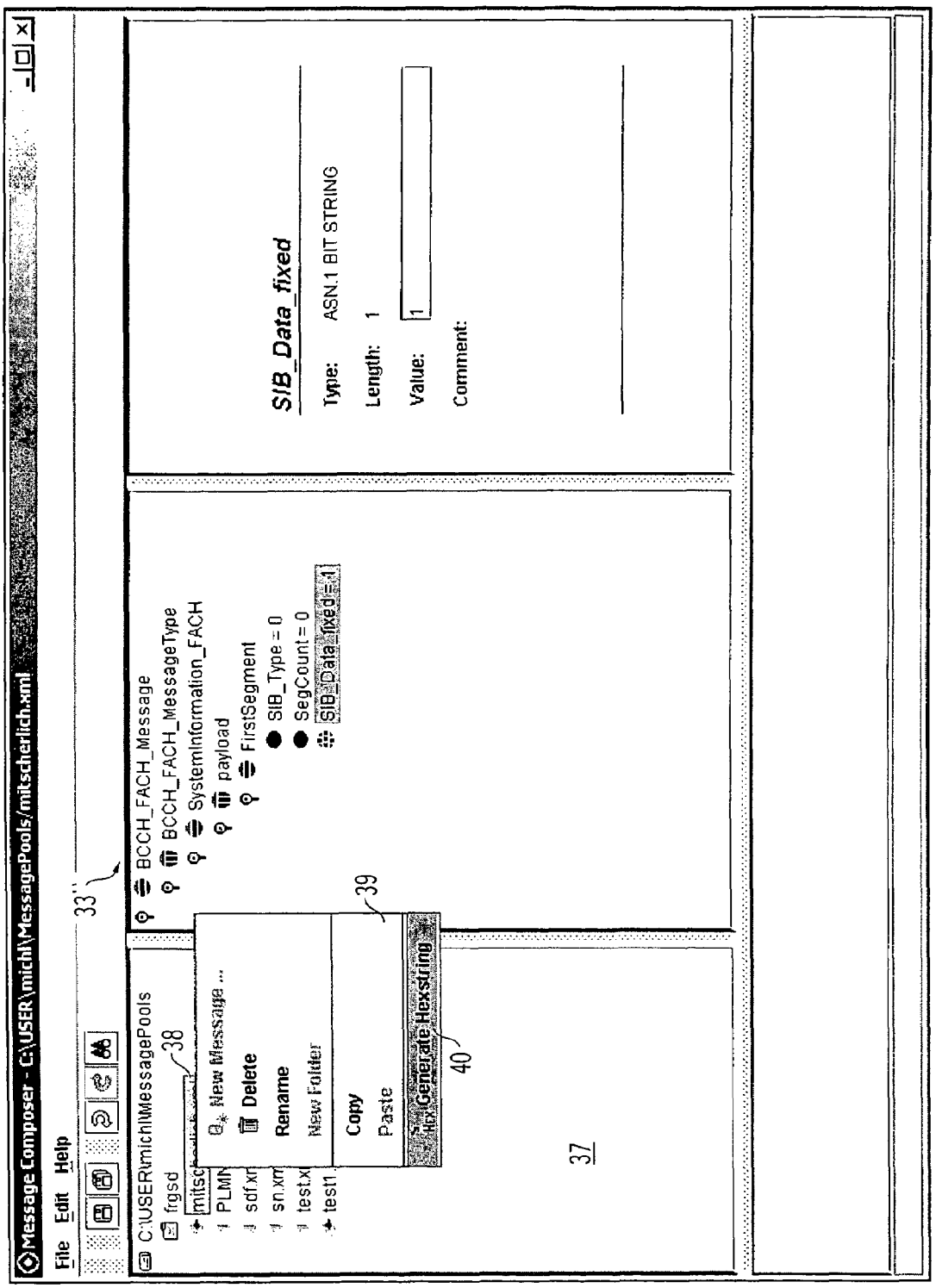
FIG. 10 shows a screen shot for selecting an output of a new message.

Additionally, however, the option is available, to translate the message, of which the storage position is indicated in a third window 37, directly into a hexadecimally-formatted string, which can be inserted into a program code. For this reason, the file 38 to be stored is marked in the third window 37, and a pull-down menu 39 is opened, as shown in FIG. 10. A hexadecimal string (hexagonal sequence), which can then be stored in a further file via the function "Generate Hexstring", is generated from the XML code.

Figure 11:
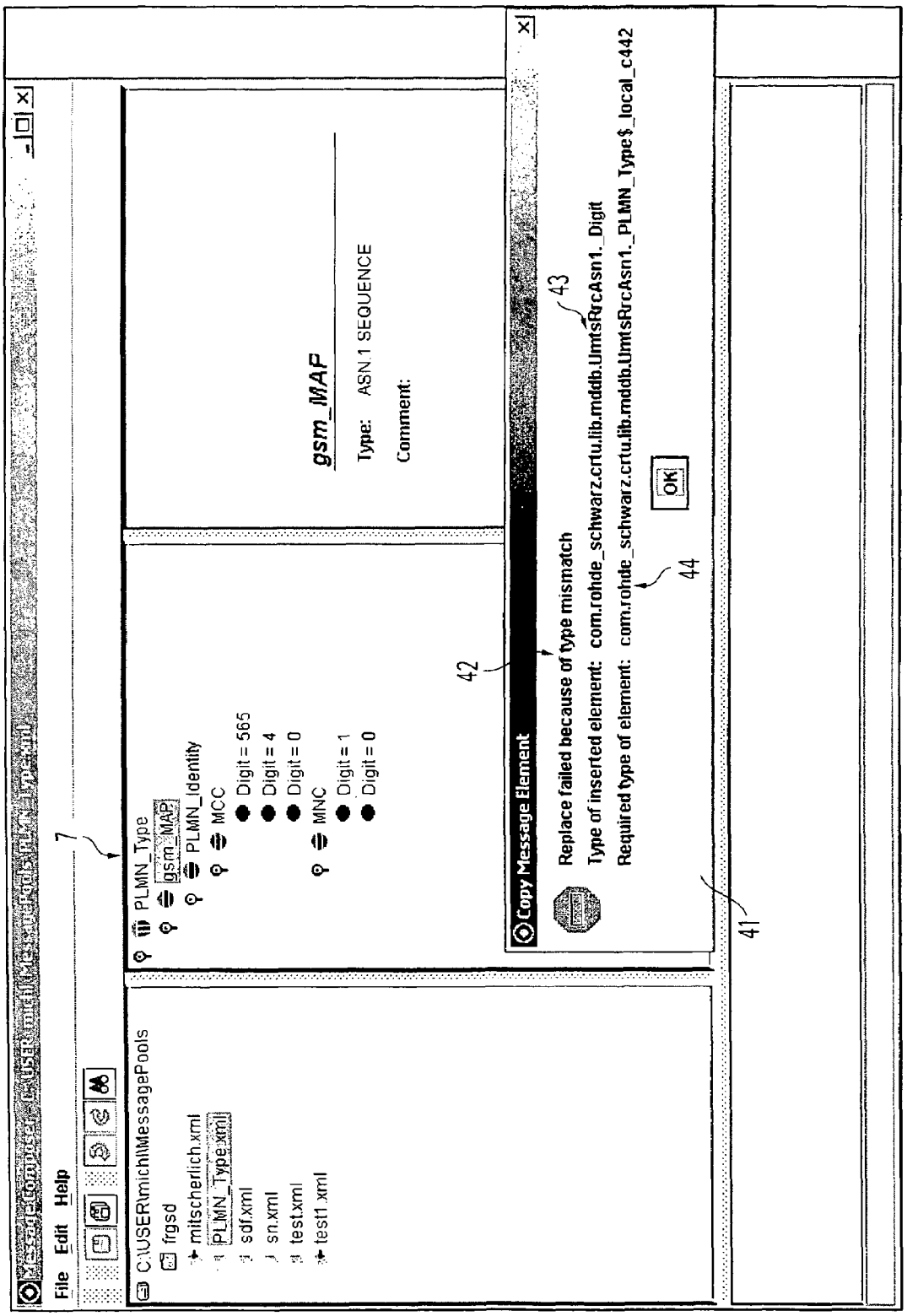
FIG. 11 shows a screen shot with a warning message.

FIG. 11 shows a warning message 41, which is displayed, when a modification of a structural unit is invalid within the framework of the structure of the message 7 to be modified. In this context, the warning message 41 initially indicates a cause 42 for the error modification. Furthermore, the erroneously modified structural unit is shown in a second line 43 of the warning message 41. If it is unambiguous on the basis of the structure of the message 7, which type of a structural unit or which content modification should be used instead, this is indicated in another line 44. To prevent errors, a warning message 41 of this kind must be acknowledged by activating an entry field.

Figure 12:
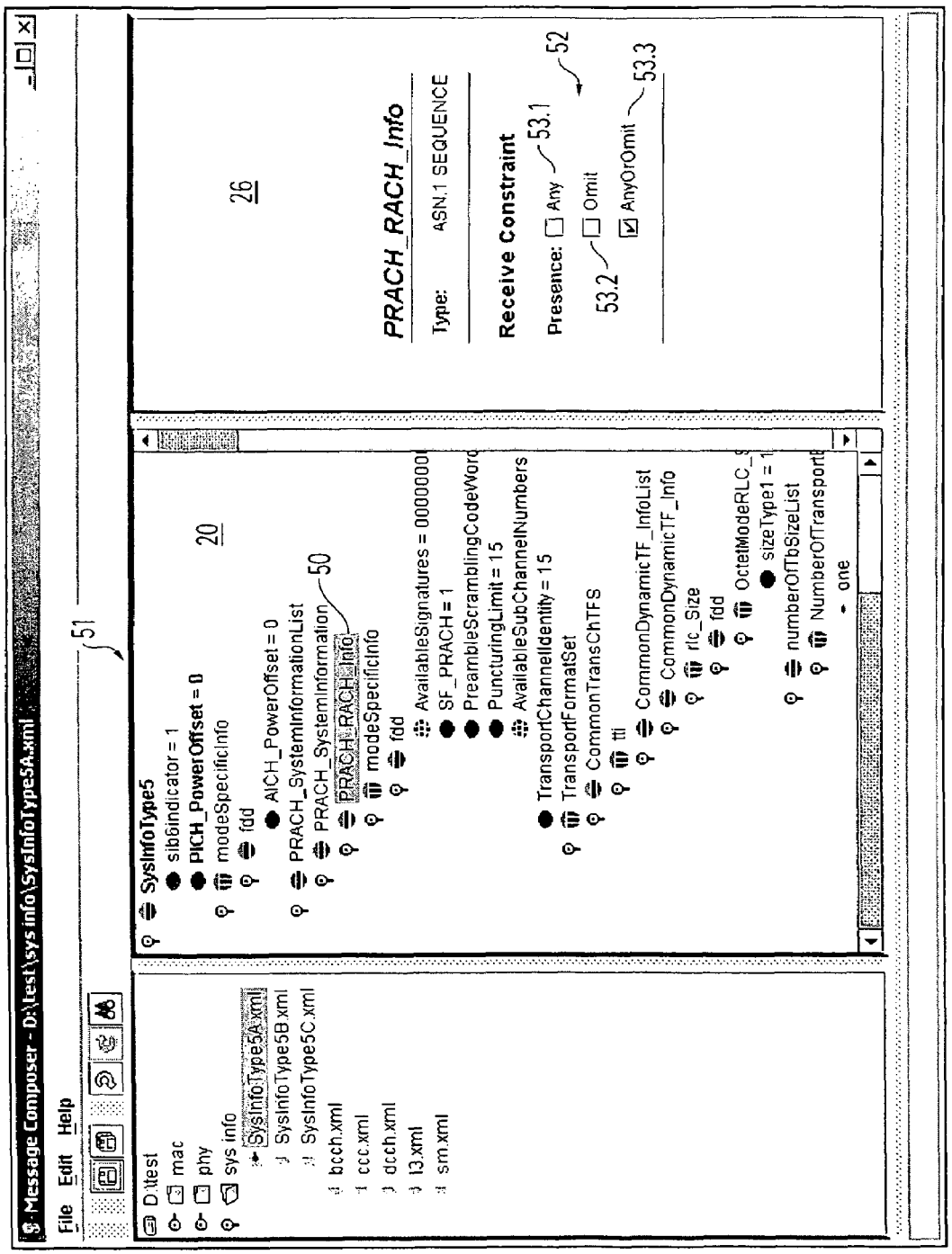
FIG. 12 shows a screen shot for determining a comparison criterion.

FIG. 12 shows how a message 51 can be used as a comparison message by determining a comparison criterion. Comparison messages of this kind are used to allocate to given message groups real messages, which are stored in a "log file", for example, during a test run. Accordingly, for example, to allow an improved analysis within a given message structure, messages, which provide a given structural unit with e.g. the same content, can be combined in a message group.

To determine such comparison criteria for a given structural unit, the corresponding structural unit is marked in the first window 20, as shown in FIG. 12 for a structural unit 50. The marked structural unit 50 is selected, and the possible comparison criteria 52 for this structural unit 50 are displayed in the second window 26. In the example shown, it is possible to choose between three different criteria, wherein, in the case of an agreement between a real message and the comparison criteria determined in the comparison message, the real message is allocated to the message group, which is represented by the comparison message.

If a first comparison criterion 53.1 of the possible comparison criteria 52 is marked in the second window 26, then the comparison criterion 53.1 is stored together with the comparison message, for example in a separate file. Messages, of which the structure corresponds to the structure of the message 51, would then be allocated to the message group defined by the comparison message presented, wherein the corresponding structural unit 50 could provide any desired content.

By contrast, a marking of the comparison criterion 53.2, would only allocate a real message to the message group, if the structural unit corresponding to the structural unit 50 of the real message to be compared had no content. In the exemplary embodiment presented, a third comparison criterion 53.3 is marked, according to which a real message is allocated to the corresponding message group both in the presence and also in the absence of a content.

Figure 13:
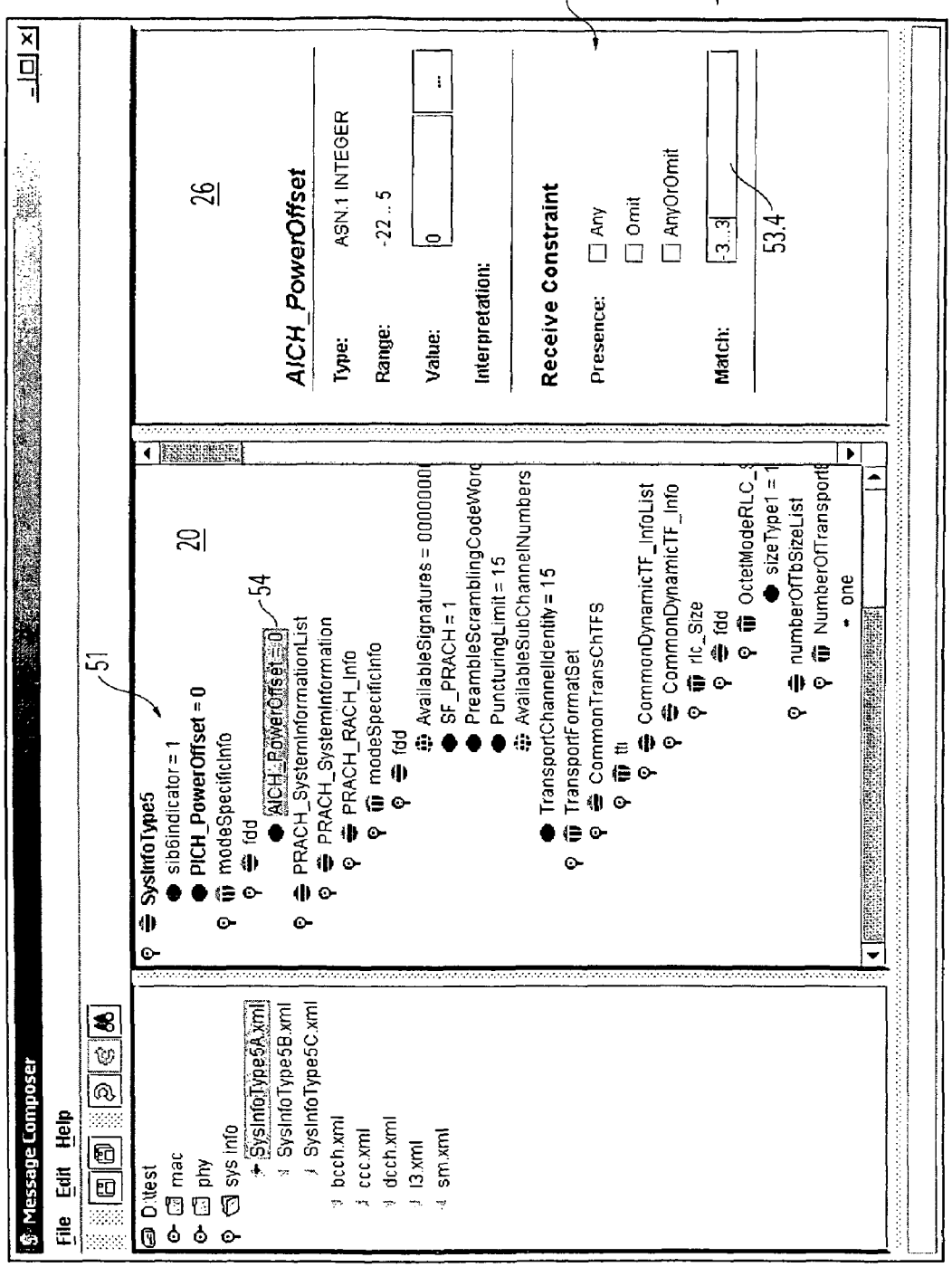
FIG. 13 shows a screen shot for determining another comparison criterion.

FIG. 13 shows a further possibility for determining comparison criteria and therefore for generating a comparison message. In the first window 20, another structural unit 54 of the message 51 is marked. By contrast with the structural unit 15 marked in FIG. 12, the structural unit 54 can have an alphanumerical value as its content. Accordingly, in the comparison of a real message with the comparison message, after the selection of the marked structural unit 54, the question is asked regarding whether the content of the structural unit of the real message is disposed within the value range indicated by a fourth comparison criterion 53.4. This fourth comparison criterion 53.4 is determined by entering a value range in an entry field 55.

The present invention provides embodiments that can include a computer readable medium having a computer program with program-code means stored on the computer readable medium in order to implement a method for modifying messages of hierarchical modular structure, where the program is executable using a computer or a digital signal processor. The present invention also provides embodiments that can include a machine-readable data medium having a program with program-code means stored on the machine-readable data medium in order to implement a method for modifying messages of hierarchical modular structure. Furthermore, the present invention provides embodiments that can includes a computer software product including a machine-readable data medium with program-code means stored on the machine-readable data medium in order to implement a method for modifying messages of hierarchical modular structure, where the software is executable using a computer or a digital signal processor.

While the present invention has been described in connection with a number of embodiments and implementations, the present invention is not so limited but covers various obvious modifications and equivalent arrangements, which fall within the purview of the appended claims.

The invention claimed is:

1. A method for modifying messages transmittable via an electronic message transmission system by an electronic arithmetic device, said method comprising:
reading in a message having a hierarchical modular structure including a plurality of structural units;
determining the hierarchical modular structure of the message;
selecting an individual structural unit of the plurality of structural units of the message;
determining one or more feasible modifications of the selected individual structural unit, wherein feasibility of the one or more feasible modifications is based upon a structural unit type of the selected individual structural unit without regard to the hierarchical modular structure of the message;
displaying the one or more feasible modifications;
reading in a selected modification of the one or more feasible modifications;
determining validity of the selected modification, wherein the selected modification is determined to be valid if the selected modification would not change the hierarchical modular structure of the message;
implementing the selected modification if the selected modification is determined to be valid; and
issuing a modified, new message.

2. A method according to claim 1, wherein:
a real message is read in as the message.

3. A method according to claim 1, wherein:
a basic message is read in from a data bank as the message.

4. A method according to claim 1, further comprising:
displaying the particular hierarchical modular structure of the message as a whole read in or the basic message in a first window of a display device.

5. A method according to claim 4, wherein:
an individual structural unit marked in the first window of the display device is selected.

6. A method according to claim 4, further comprising:
displaying feasible modifications for the selected individual structural unit in a second window of the display device.

7. A method according to claim 6, further comprising:
reading in at least one marked element of a selection list in the second window in order to modify content of the structural unit.

8. A method according to claim 6, further comprising:
reading in a value entered alphanumerically in the second window in order to modify content of the structural unit.

9. A method according to claim 1, further comprising:
displaying a warning message on the display device, if an element which is invalid with regard to the particular hierarchical modular structure of the message as a whole is read in, or if an alphanumerical value which is invalid for modification of the content of the individual structural unit is read in.

10. A method according to claim 1, further comprising:
implementing a plurality of modifications of several individual structural units are implemented, before the modified, new message is issued.

11. A method according to claim 1, further comprising:
issuing, as a binary sequence, the new message generated by modifying at least one individual structural unit.

12. A method according to claim 1, further comprising:
presenting a pull-down menu with functions that can be opened in the first window for the selected individual structural unit, wherein the functions presented in the pull-down menu are dependent upon the selected individual structural unit and/or of the particular hierarchical modular structure of the message as a whole.

13. A method according to claim 1, further comprising:
issuing the modified, new message as a comparison message for the allocation of real messages to a message group, wherein comparison criteria are determined with the comparison message.

14. A method according to claim 13, further comprising:
storing the comparison message in a separate file with one or more of the comparison criteria.

15. A method according to claim 13, further comprising:
determining a value range for the content of a structural unit as a comparison criterion.

16. A method according to claim 13, further comprising:
determining the presence of a given content of a structural unit as a comparison criterion.

17. A device for modifying messages transmittable via an electronic message transmission system, comprising:
a message read-in device configured to read in a message having a hierarchical modular structure including a plurality of structural units;
a structure-determining device configured to determine the hierarchical modular structure of the read-in message;
a selection device for selecting an individual structural unit of the plurality of structural units of the message;
a determining device configured to determine one or more feasible modifications of the selected individual structural unit, wherein feasibility of the one or more feasible modifications is based upon a structural unit type of the selected individual structural unit without regard to the hierarchical modular structure of the message;
a display device configured to display the one or more feasible modifications;
a modification read-in device configured to read in a selected modification of the one or more feasible modifications;
a test device configured to test the validity of the selected modification, wherein the selected modification is determined to be valid if the selected modification would not change the hierarchical modular structure of the message, and wherein the test device is configured to implement the selected modification if the selected modification is determined to be valid; and
an output device configured to issue a modified new message.

* * * * *